Dec. 16, 1958 L. H. PHIFER 2,864,279

SPECTROPHOTOMETER CELL HOLDER

Filed Nov. 7, 1955

United States Patent Office 2,864,279

Patented Dec. 16, 1958

2,864,279

SPECTROPHOTOMETER CELL HOLDER

Lyle H. Phifer, West Chester, Pa., assignor to American Viscose Corporation, Philadelphia, Pa., a corporation of Delaware Application November 7, 1955, Serial No. 545,170

8 Claims. (Cl. 88—14)

The invention relates to a holder and particularly to a film and cell holder for use in spectrophotometric studies.

In accordance with the conventional procedure for spectrophotometric investigations and analysis, the intensity of a light beam passing through a test material, either a film or fluid, is compared with the intensity of a light beam having a path through a standard composed of similar material of known value or concentration. By this method, studies of the properties of various materials, as for example their light absorption characteristics, and colorimetric analysis can be accomplished with ease and with highly reliable results.

The conventional spectrophotometer sample holders have been found unsatisfactory for various applications, as for example where a short light path is desired, and are not readily adapted for interchangeable use with films and fluids. For example, in a commercially available quartz photoelectric spectrophotometer, the sample holder consists of a pair of integrally supported juxtaposed receptacles into which a matched pair of fluid receiving cells are disposed. Cells of 5 millimeters and 10 millimeters rectangular cross-section can be obtained and where a material having a high absorptivity is undergoing study, cells measuring 1 millimeter or spacers for use with the 10 millimeter cells are employed. Besides entailing a high initial and replacement cost, these existing cell structures are extremely difficult to thoroughly clean for reuse, particularly when a viscous fluid is placed within the smaller cells or the partitioned larger cells. Further, when utilizing the conventional holders with films, it is the common practice to merely secure the films to one face of the holder in intersecting relationship with the light beam paths. Since the particular areas of the films being subjected to the light beams are not satisfactorily supported, the results obtained often varied with the degree of skill and care exercised in attaching the films in place. In view of these above-noted disadvantages, it is a primary object of the present invention to provide a generally improved and more satisfactory spectrophotometer film and cell holder.

Still another object is the provision of a holder adapted for interchangeable use with films or fluids.

A still further object is the provision of an adjustable spectrophotometer sample holder capable of providing cells of any desired and easily measured thickness.

A further object is to provide a holder adapted to hold the standard and test films in taut and juxtaposed relationship.

A still further object is to provide a holder which is simple in construction and use, is readily disassembled for cleaning, and is adapted for economical production by mass production methods with existing equipment.

These and other objects and advantages of this invention will be apparent from the following description and accompanying drawing in which.

Figure 1:
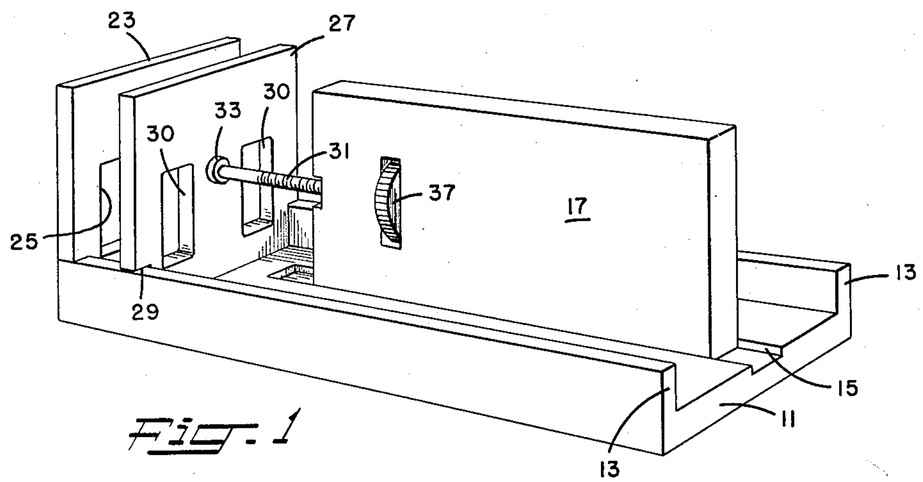
Figure 1 is a perspective view of the holder of the present invention.

The invention, in general, relates to a sample holder for use in the spectrophotometric studies and includes a pair of jaws which are adapted to grip a pair of transparent plates between which are disposed, in juxtaposed relationship, a test sample and a sample or standard of known characteristics. Each of the gripping jaws is provided with a pair of laterally spaced apertures, with the respective apertures of both jaws being aligned to enable light beams to pass through the samples and be received by the light responsive mechanism of the conventional spectrophotometer. By employing spacers of various thicknesses between the transparent plates, it is of course obvious that cells of different sizes can be formed for use in spectrophotometric analysis of fluids.

With reference to the drawing, the holder includes a channel-shaped base having a web 11 and a pair of upwardly extending flanges 13 which add rigidity to the holder and serve as guides as hereinafter described. Approximately centrally between the flanges 13, the upper surface of the web 11 is provided with a groove 15 extending longitudinally thereof for the greater portion of its length. A vertical plate 17 has its lower end disposed within the groove 15 and is secured thereto by screws 19 extending upwardly from the undersurface of the web 11 through the elongated and countersunk slots 21. The plate 17 functions as a support for structure hereinafter described and also as a partition for maintaining the spectrophotometric light beams in their respective paths.

Figure 2:
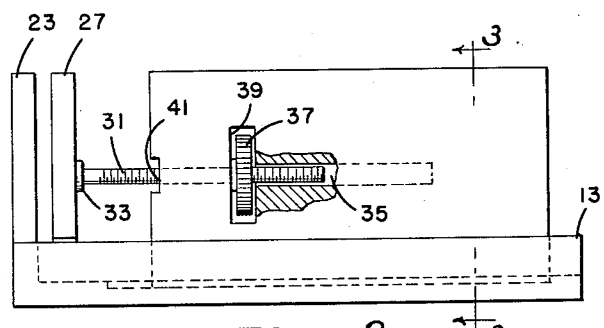
Figure 2 is a side view of the structure shown in Figure 1, with a portion thereof shown in section.
Figure 3:
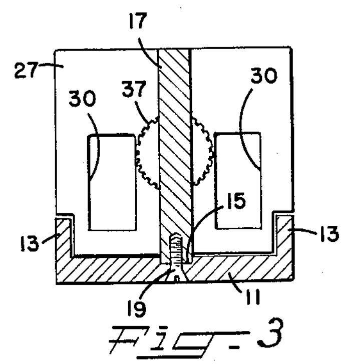
Figure 3 is a transverse vertical section taken on the line 3—3 of Figure 2.
Figure 4:
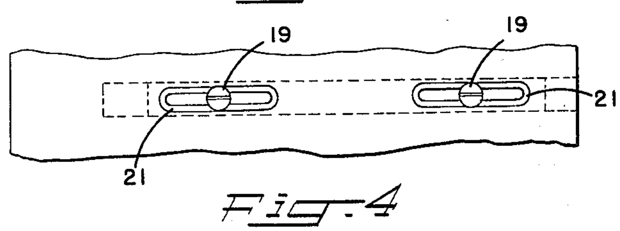
Figure 4 is a bottom view of a portion of the structure shown in Figure 2.

Secured, as by welding, between the flanges 13 at one end of the holder base is a stationary gripping jaw 23 having a pair of spaced rectangular apertures 25. A movable gripping jaw 27 is positioned parallel to the jaw 23 and has the lowermost portions of its side edges notched at 29 to form guide surfaces which ride along the tops and sides of the flanges 13. To permit continuous travel of the light beams through the holder jaws, the movable jaw 27 is provided with apertures 30 which are similar to and in aligned relationship with the aperture 25. Movement is imparted to the jaw 27 by a threaded stud 31 having its enlarged end 33 welded or otherwise fixed to a face of the jaw 27 approximately at its center. The remainder of the stud is disposed at right angles to the jaw 27 with its opposite end positioned within the opening 35 extending partially through the plate 17 from its left end, as viewed in Figure 2. A circular nut or adjusting wheel 37 is threaded onto the stud 31 and extends through the slot 39 formed in the plate 17 at approximately right angles to the opening 35. A roughened or knurled surface is formed on the circular periphery of the nut 37 to provide a suitable gripping surface. To enable the jaw 27 to be fully retracted against the adjacent edge of the plate 17, the plate 17 is suitably notched at 41 for reception of the enlarged head 33 of the stud 31.

Figure 5:
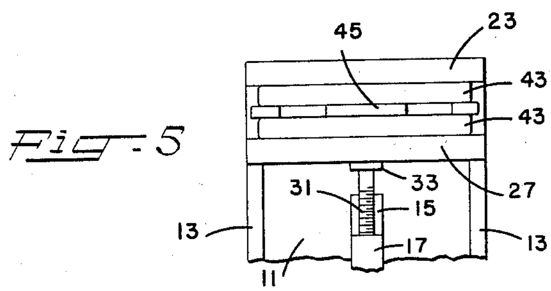
Figure 5 is a top view of a portion of the holder of the present invention employed with a spacer for providing a short light path cell.
Figure 6:
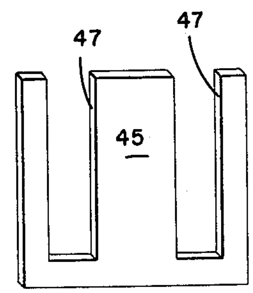
Figure 6 is a perspective of the spacer shown in Figure 5.

In utilizing the holder of the present invention for studying sheets or films, the standard film of known characteristics and the test sample are disposed in juxtaposed position between a pair of transparent plate 43, as for example, of glass shown in Figure 5. The glass plates, with the samples therebetween, are then positioned between the stationary and fixed jaws 23 and 27, respectively with the films being aligned with the apertures 25 and 30. The adjusting wheel 37 is then rotated to advance the stud to the left, as viewed in Figure 2, to effect a tight gripping of the plates 43 and samples between the holder jaws. The holder is then positioned within a conventional spectrophotometer for study by passing light beams through the samples and onto the light responsive means in the usual and known manner. By means of the present holder, the sheets or films are maintained in a stretched and coplanar relationship without the need of any makeshift arrangement as is customarily used.

When it is desired to analyze fluids by means of spectrophotometric techniques, a spacer 45 is positioned between the glass plates 43 as shown in Figure 5. The spacer includes a pair of vertical slots 47 which are open at their upper ends and are adapted to be aligned with the apertures 25 and 30 in the gripping jaws 23 and 27, respectively. Any suitable chemically inert material can be employed in forming the spacer 45, with highly satisfactory results being obtained with polytetraflouroethylene resin, commercially available under the trademark of "Teflon."

When utilizing the holder and spacer as a unit, the spacer is first placed between the glass plates 43 which in turn are positioned between the jaws 23 and 27 and tightly gripped therein by actuating the adjusting wheel 37 as heretofore described. The fluid of known characteristics employed as a standard is then placed within one of the cells formed by the spacer slot 47 and the plates 43, while the fluid test sample is placed in the remaining juxtaposed cell, after which the holder is placed within the spectrophotometer. The faces of the glass plates 43 and the gripping jaws 23 and 27 are formed with true surfaces so that the light cells are of the same thickness throughout their length and width. Since the spacer 45 may have a tendency to be compressed when gripped between the jaws 23 and 27, an accurate measurement of the cell light paths can be obtained by merely measuring, as for example, with a micrometer, the distance between the outermost faces of the jaws 23 and 27 and subtracting these from the thickness of the transparent plates 43 and the jaws 23 and 27, which of course are known and remain constant.

It is seen that the holder of the present invention enables light path cells of various dimensions to be formed by merely employing a spacer 45 of a desired thickness, where an extremely short light path cell is essential, as for example when materials of high absorptivity are undergoing study or where a long light path cell is required, the plate 17 may be adjusted along the groove 15 by manipulating the screws 19. Besides being simple in construction and use, it will be readily recognized that the holder described is extremely flexible for use with either films or fluids, the latter of which can be placed in cells of practically any desired light path dimension.

It is seen from the above description that the objects of the invention are well fulfilled by the structure described. The description is intended to be illustrative only and it is to be understood that changes and variations may be made without departing from the spirit and scope of the invention as defined in the appended claims.

I claim:

1. A holder for use in spectrophotometer analysis including a pair of gripping jaws, means for adjusting said jaws relative to each other, a pair of transparent plates gripped between said jaws for supporting a pair of juxtaposed samples therebetween, a pair of laterally spaced apertures in each of said jaws with the respective apertures in said jaws being in aligned relationship, said apertures allowing individual light beams to pass through said juxtaposed samples, and means for maintaining said individual light beams in their respective paths.

2. A construction as defined in claim 1 wherein said last-mentioned means is adjustably mounted for movement in a direction approximately at right angles to the plane of one of said jaws.

3. A construction as defined in claim 1 wherein one of said gripping jaws is moved by means of a threaded member extending between said movable jaw and said last-mentioned means.

4. A holder for use in spectrophotometer analysis including a pair of gripping jaws, means for adjusting said jaws relative to each other, a pair of transparent plates, a pair of laterally spaced apertures in each of said jaws with the respective apertures of said jaws being in aligned relationship, a spacer having a pair of laterally spaced slots, said transparent plates with said spacer interposed therebetween being gripped between said jaws, said spacer slots being aligned with said apertures in said jaws and forming fluid receiving cells through which individual light beams may pass, and means for maintaining the individual light beams in their respective paths.

5. A construction as defined in claim 4 wherein said spacer is formed of polytetrafluoroethylene.

6. A construction as defined in claim 4 wherein said spacer is formed of a non-metallic material and said pair of laterally spaced slots extend vertically of said spacer and open at the upper end thereof.

7. A holder for use in spectrophotometer analysis including a pair of substantially parallel jaws between which test samples are to be disposed in a juxtaposed relationship with each other, means for adjusting said jaws relative to each other to vary the spacing therebetween, a pair of laterally spaced apertures in each of said jaws with the respective apertures in said jaws being in aligned relationship, said apertures allowing individual light beams to pass through said juxtaposed samples, and means for maintaining the individual light beams in their respective paths.

8. A construction as defined in claim 7 further including means for guiding one of said jaws during the adjustment thereof.

References Cited in the file of this patent

UNITED STATES PATENTS

| | | |
|---|---|---|
| 945,619 | Sharlow | Jan. 4, 1910 |
| 1,967,583 | McFarlane et al. | July 24, 1934 |
| 2,330,026 | Blau | Sept. 21, 1943 |
| 2,442,462 | Kirschbaum | June 1, 1948 |
| 2,617,940 | Giguere | Nov. 11, 1952 |
| 2,700,320 | Malmros | Jan. 25, 1955 |

FOREIGN PATENTS

| | | |
|---|---|---|
| 827,720 | France | Jan. 28, 1938 |